United States Patent [19]

Nathanson

[11] Patent Number: 5,447,439

[45] Date of Patent: Sep. 5, 1995

[54] INTERACTIVE STORY BOOK USING STICKERS AND A METHOD OF TEACHING

[76] Inventor: Ted Nathanson, 352 Central Ave., Scarsdale, N.Y. 10583

[21] Appl. No.: 89,663

[22] Filed: Jul. 9, 1993

[51] Int. Cl.⁶ .............................................. G09B 3/00
[52] U.S. Cl. .................................. 434/346; 434/348; 434/331; 434/404; 434/405
[58] Field of Search ............... 434/327, 331, 346, 348, 434/404, 405, 428

[56] References Cited

U.S. PATENT DOCUMENTS

| | | |
|---|---|---|
| 886,172 | 4/1908 | Bevans . |
| 2,582,908 | 1/1952 | Larzelere . |
| 2,946,137 | 7/1960 | Worth et al. . |
| 3,174,231 | 3/1965 | Schure ................................ 434/331 |
| 3,251,141 | 5/1966 | MacRae ............................... 434/331 |
| 3,570,139 | 3/1971 | Ladd et al. .......................... 434/346 |
| 3,768,175 | 10/1973 | Hill et al. . |
| 4,487,585 | 12/1984 | Goldwasser .................... 434/346 X |
| 4,687,203 | 8/1987 | Spector .......................... 434/346 X |
| 4,714,275 | 12/1987 | Engel et al. . |
| 5,269,691 | 12/1993 | Waldman ............................ 434/429 |

Primary Examiner—Gene Mancene
Assistant Examiner—Jeffrey A. Smith
Attorney, Agent, or Firm—Darby & Darby

[57] ABSTRACT

A story book assembly and a method of teaching wherein a child first studies a first element of information, then locates an empty space adjacent to first element. The empty space is intended to receive a second related element of information. After comparing what is available, the child selects an appropriate second element from a remote source. The second element is initially located on an exposed surface of a movable card. The movable card includes a hidden surface, on which a third element of information is disposed. The hidden surface is selectively exposed by the child so that the third element may be viewed. The selected movable card is then placed within the empty space so that the second element may be viewed together with the first element. The third element relates to the second element and the second element relates to the first element. The child is taught and observes the designed relationship between any first element and the second element and any relationship between the second element and the third element.

6 Claims, 4 Drawing Sheets

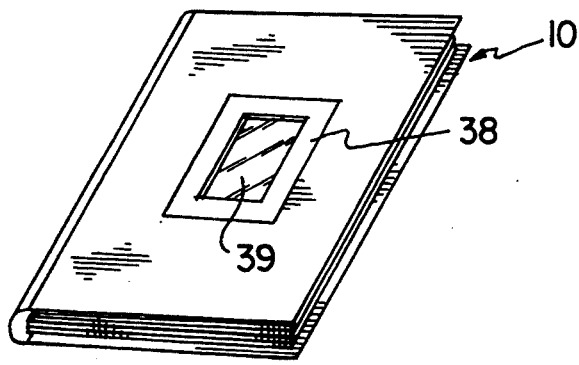
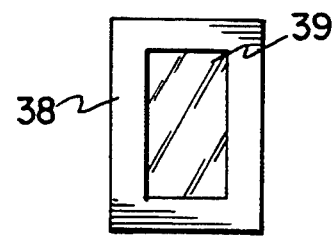
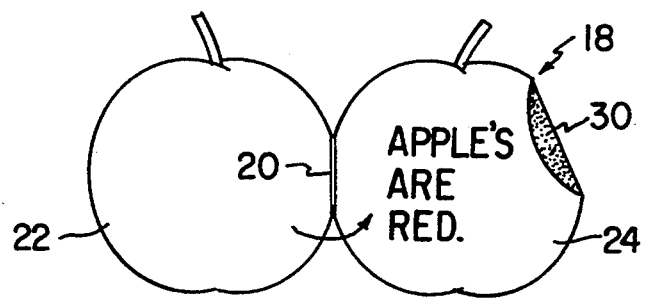
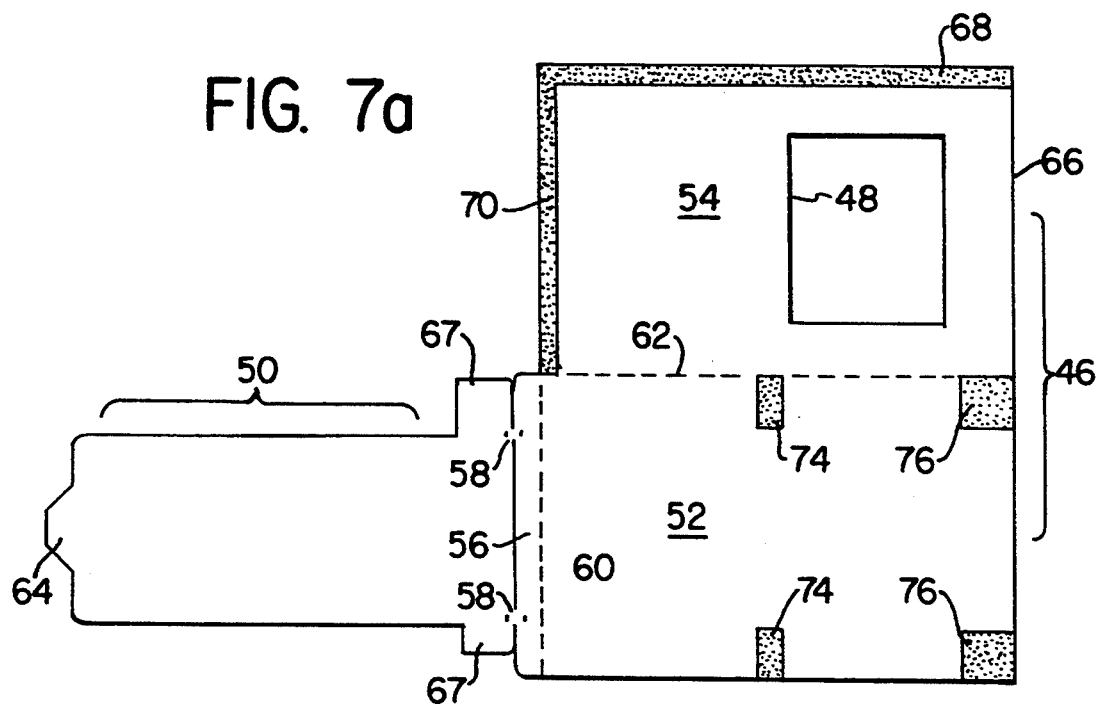

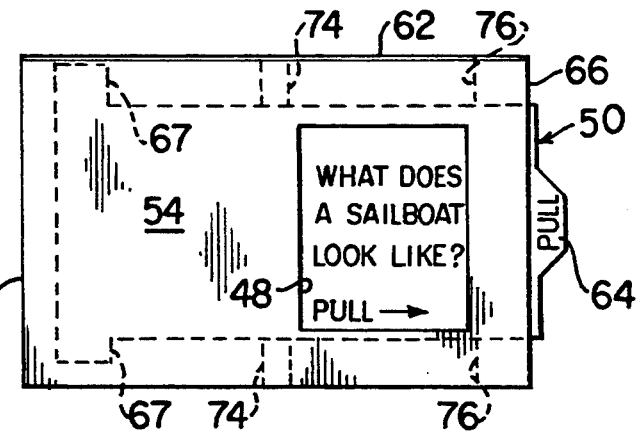
FIG. 7b
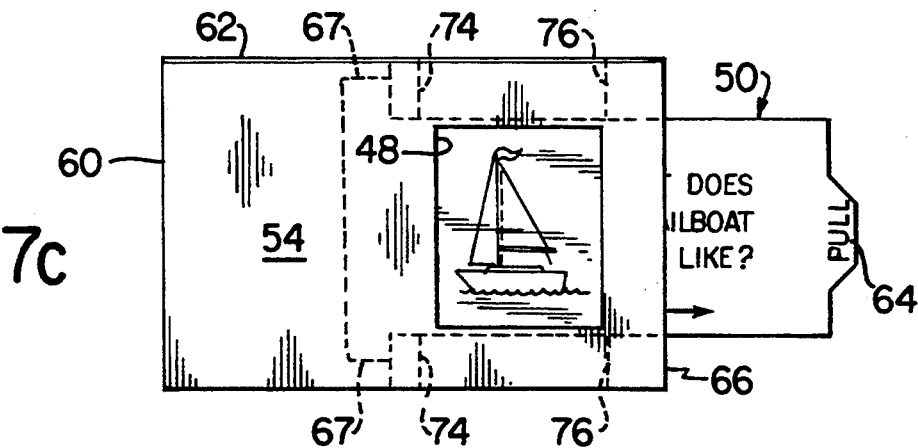
FIG. 7c
FIG. 8
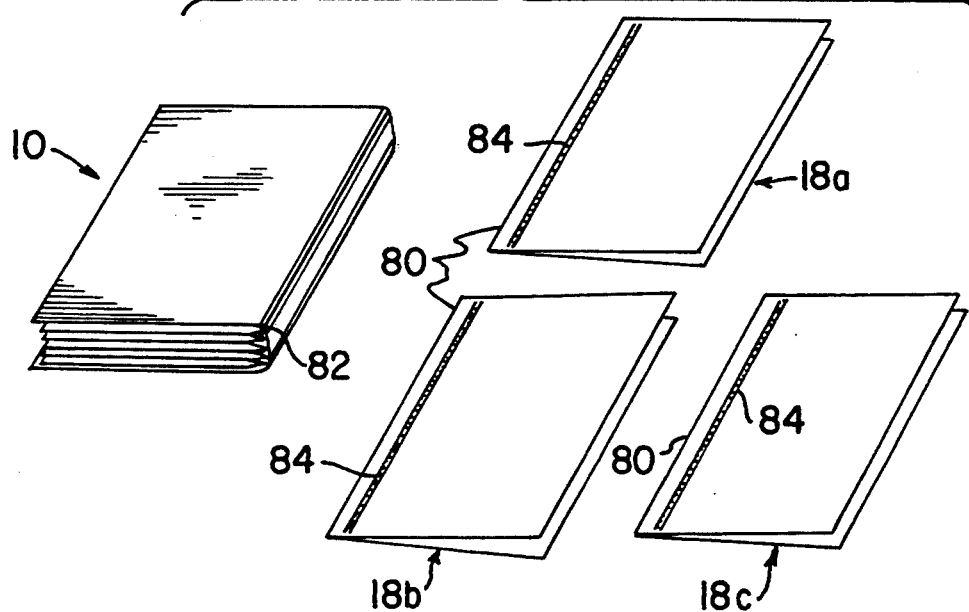

INTERACTIVE STORY BOOK USING STICKERS AND A METHOD OF TEACHING

FIELD OF THE INVENTION

This invention relates to improvements in interactive story books and methods using interactive story books to teach children, especially interactive story books having selectively positionable sticker-inserts.

BACKGROUND OF THE INVENTION

There are hundreds of story books on the market today for instructing and entertaining children. Of the children's books intended for instructing children, the most effective are those which rely on the actions of the child to interact physically with each lesson or story that he/she is being taught. These are collectively referred to as interactive or activity books and usually include pages of either pictures or text (or both) which are incomplete, hidden or shown in a scrambled arrangement. The child is encouraged to unscramble, complete or uncover (by, for example, lifting or sliding a panel) the arrangement of pictures and/or text which are designed to make up the particular lesson or story. It is through this physical interaction with the pictures and text that the child not only becomes engrossed in a particular lesson, or taught a particular story, but is entertained in the process and is more likely to continue with other lessons or stories. The child is attracted to each situation or exercise more as a game or a puzzle and is, therefore, more likely to become better engaged, with a better chance for satisfactory retention. As the child physically interacts with each lesson, he or she is more likely to retain the teachings of the lesson and to progress than if learning from less interactive story books such as simple picture or ABC books.

The interactive story books of the present invention involve the provision of a) a first informative element that presents pieces of information in connection with each story, or a portion thereof, in the form of one or more (e.g., a related series of) words, pictures, symbols, colors, or other media of communication perceptible to a child; b) an empty space adjacent to such first informative element; and, c) a second informative element that is one of a number of stickers or the like supplied on a separate or remote sheet (either bound or inserted into the story book), each one of which includes a single exposed (front) face on which is presented additional information also in the form of one or more words, pictures, symbols, colors, or other media of communication perceptible to a child. The method of teaching of the present invention involves having the child compare the first informative element with the stickers to determine which sticker most closely relates to the first informative element. The child then positions, as the second informative element the chosen sticker and secures such second informative element in the empty space.

Each interactive children's book functions as an important educational tool by using an entertaining activity to "lure" children away from other less educational, albeit entertaining, daily activities, such as watching television. Interactive children's books teach and encourage children to learn through direct physical involvement. Through this involvement the child becomes an important part of the teaching/learning process. The books teach children to learn by requiring the child to use his or her hands and think before doing it. The more "fun" the interactive books are, the more apt the child is to continue to read and learn from books rather than watch television.

It is therefore an object of the invention to provide an interactive story book which overcomes the problems of the prior art by further engaging and entertaining a child during the instruction process.

It is an object of the invention to provide an interactive story book which encourages at least two direct interactions by a child to further strengthen the teachings of a particular lesson.

It is another object of the invention to provide such an interactive story book using selectively positionable stickers wherein each sticker offers a second opportunity for interaction by the child to reinforce the particular lesson further.

SUMMARY OF THE INVENTION

A method of instruction wherein a child first scans or studies a first element of information, then locates an empty space adjacent to first element. The empty space is intended to receive a second related element of information. After comparing a number of possible second informative elements provided to the child, he or she selects the appropriate second element from a remote source and puts it into the empty space. The second element is initially located on an exposed surface of a movable sticker. The movable sticker includes a hidden surface, on which a third element of information is disposed. The selected movable sticker is placed within the space so that the second element may be viewed together with the first element. The hidden surface is selectively exposed by the child so that the third element may be viewed. The third element is designed to relate to the second element and the second element is designed to relate to the first element. The child is taught and observes any designed relationship between the first element and the second element and any designed relationship between the second element and the third element and having taken an active part in constructing them is expected to learn from such observation and participation.

BRIEF DESCRIPTION OF THE DRAWINGS

FIGS. 5a is a perspective view of a story book showing "answer glasses" in accordance with another embodiment of the invention;

FIG. 5b is a plan view of the "answer glasses" of FIG. 5a;

FIG. 6 is a plan view of a sticker in accordance with another embodiment of the invention showing an unfolded orientation;

FIG. 7a is a plan assembly view of a "slide-to-side" sticker in accordance with another embodiment of the invention;

FIG. 7b is a plan view of an assembled "slide-to-side" sticker showing a slide panel in a pre-used position;

FIG. 7c is a plan view of the assembled "slide-to-side" sticker of FIG. 7b showing the slide panel in a used position;

FIG. 8 is a perspective assembly view of a story book and three sticker pages in accordance with another embodiment of the invention;

DETAILED DESCRIPTION OF THE PREFERRED EMBODIMENT

Figure 1:
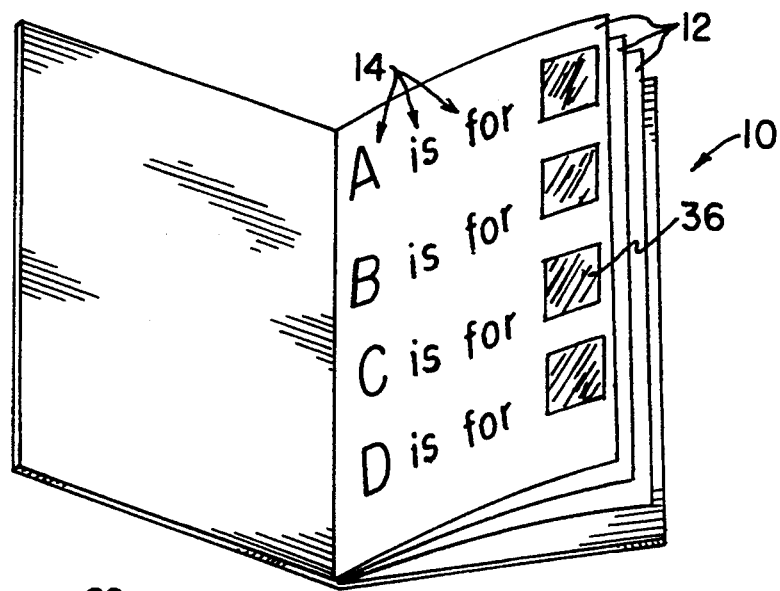
FIG. 1 is a perspective view of a story book showing informative elements in accordance with the invention.

Referring to FIG. 1, a children's book 10 is illustrated having pages 12 and at least one group of informative elements 14. The children's book 10 may be either a bound collection of pages 12 or offered as individual, unbound pages (not shown). An "informative element" is a term used here to describe any picture, word, letter, color, shape, material, raised or embossed surface or sound which is to be viewed, felt, or heard by a child for the purpose of being instructed and/or entertained. The invention anticipates the use of one or more of such informative elements and a group of informative elements may indicate or imply part of a sequence, encouraging the child to think of which elements are missing. For example, the incomplete sentence: "A IS FOR (empty space)" is shown at the top of the page 12 of book 10 in FIG. 1. In this example, the words "A", "IS" and "FOR" represent informative elements 14. Here, three of the four informative elements 14 are provided and an empty space is provided for a fourth. The child must determine the appropriate fourth element 14 which relates to at least one of the other three, such as the word "APPLE".

Figure 2:
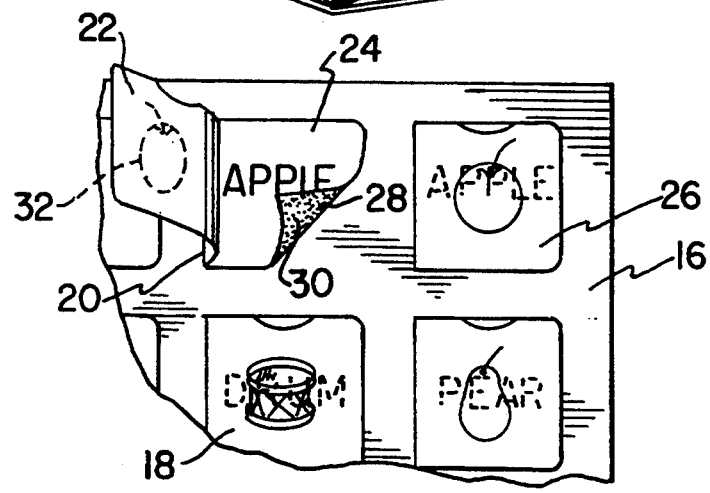
FIG. 2 is a partial enlarged perspective view of a sticker sheet showing stickers in accordance with one embodiment of the invention.

In accordance with a preferred embodiment of the invention, as shown in FIG. 2, the book 12 is provided with a sticker sheet 16 of various informative elements 14 from which the child may choose. The sticker sheet 16 includes an array of stickers 18. For present purposes, the term "sticker" means any of several devices, as described in greater detail below. In this first, preferred embodiment, each sticker 18 is made up of a folded sheet of a material, such as paper, folded along a hinging edge 20, and includes a first inside panel 22, a second inside panel 24, a front outer panel 26, and a rear securement surface 28. The securement surface 28 includes a layer of an appropriate pressure-sensitive adhesive 30. The adhesive 30 is preferably reusable. As an alternative to an adhesive, the securement surface 28 may include a velcro-type fastener, flexible magnet material, or any other appropriate removable fastener. Although paper is a preferred material for the stickers 18, other materials such as cloth or a plastic, such as vinyl may be used.

The front outer panel 26 includes an outer informative element 32 such as a picture of an apple or the word "APPLE" or a sentence such as "APPLES ARE RED AND GOOD TO EAT". On at least one of the inside panels 22 and 24 is printed an inside informative element 34 which is different than the outer informative element located on the front outer panel 26, that relates in some manner to the outer informative element 32.

For example, the incomplete sentence: "A IS FOR " is made up of a group or sequence of informative elements 14 and a blank space 36. The child uses the clues provided by the sequence of informative elements 14 and searches the sticker sheet 16 for, in this example, another informative element 14 that starts with the letter "A" shown on the front outer panel 26 of any sticker 18, or otherwise fits into the sequence. One correct sticker 18, in this example, would be the one with a picture of an apple on the front outer panel 32. Once chosen, the child may peel the "APPLE" sticker 18 from the sticker page 16, thereby exposing the adhesive 30, and adhere the sticker 18 in the space 36 provided at the end of the incomplete sentence: "A IS FOR ".

Once the sentence is thus completed, the child can then open the sticker 18 and learn more about, in this case, apples, such as how to spell apple: "APPLE", what an apple looks like, or that "APPLES ARE RED AND GOOD TO EAT", etc.

In the above exercise, the child is instructed in word/picture association, hand/eye coordination, the alphabet, word spelling, and information about apples. The child is also encouraged to become engaged in and be entertained by the "game-like" procedure of picking the correct sticker 18 from the sticker sheet 16 and correctly positioning it within the text. The hidden information that is printed on the inside panel 22, 24 of each sticker 18 will further excite the child's curiosity and thereby further advance the learning process.

Depending on the application and the particular age group of the child's book, the blank space 36 may be provided with a symbol such as a number or letter which corresponds to a similar symbol located adjacent to or on the correct sticker 18 on the sticker sheet 16. The child may then use the symbols to help locate the correct sticker 18.

In another embodiment the blank space 36 may offer additional clues as to the missing element 14 that are less obvious than the use of matching symbols, as described above. For example, the blank space 36 may be shaped and/or colored as an apple and shown very faintly as a "ghost image". Alternatively, the apple shape may be outlined or printed in multi-color pattern so that the image (the clue) is only visible using special "answer" glasses 38 which have a transparent single-color window 39. In one embodiment, the answer glasses 38 are formed integrally with a cover of the book as a "punch-out" item, as shown in FIGS. 5a–5b.

Other variations of the blank space 36, in accordance with the invention include a "scratch and sniff" format, providing, in the above example, the smell of an apple. A scratch-off type format may also be used wherein the child uncovers the clue by removing (through scratching with the edge of a coin, for example) an opaque overlying layer.

Figure 3:
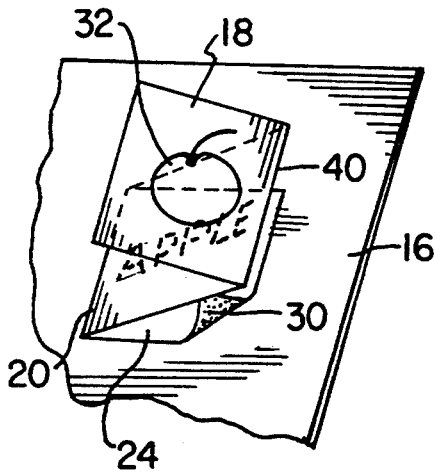
FIG. 3 is a perspective view of a multi-hinged sticker in accordance with another embodiment of the invention.
Figure 4:
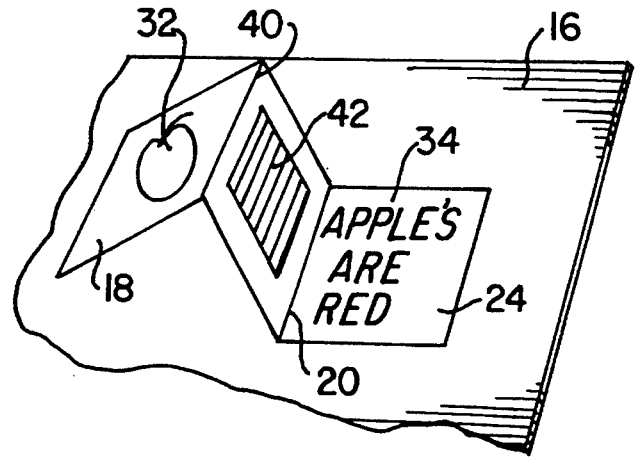
FIG. 4 is a perspective view of the multi-hinged sticker of FIG. 3 showing an unfolded orientation.

Although the stickers 18 preferably include a single hinge-line edge 20, i.e., one folded edge, they may include an additional hinge-line edge 40, as illustrated by FIGS. 3 and 4, or more hinge-lines depending on the intended application and degree of child interaction. In such a multi-folded sticker 18 as shown in FIGS. 3 and 4, a low-tack pressure-sensitive adhesive 42 may be provided between the individual panels to avoid premature opening of the stickers 18 prior to their removal from the sticker sheet 16.

In another embodiment of the invention, shown in FIG. 6, each of the individual stickers 18 are shaped specifically to provide additional information, thereby effectively functioning as additional informative elements. For use in the above example, one such sticker 18 is formed in the shape of an APPLE, instead of being the picture of the APPLE located on the front outer panel 26 in FIG. 2.

In yet another, more elaborate embodiment of the invention, each sticker 18 is provided in the form of a sliding panel assembly 44, as shown in FIGS. 7a–7c. In this embodiment, each panel assembly 44 includes an envelope portion 46, and a slide panel 50. The envelope portion 46 includes a window cutout 48, a rear panel 52, a front panel 54 and a hinge tab 56. In a preferred method of manufacture, the slide panel 50 is formed integrally with the hinge tab 56, connected only by uncut frangible points 58. The entire slide panel 50 including the hinge tab 56 is then folded along the hinge-line 60 to a position adjacent the rear panel 52. The front panel 54 is then folded along the hinge-line 62 to envelop the slide panel 50. The slide panel 50 is made slightly longer than the length of the envelope portion 46 so that a grasping tab 64 protrudes through an open edge 66 of the envelope portion 46 and is accessible to a child, as described below. The slide panel 50 includes stop tabs 67 which contact adhesive stop zones, described below, thereby preventing complete removal of the slide panel 50 from the envelope 46.

An appropriate adhesive is mask-applied in zones to the envelope portion 46 prior to folding. The zones include an upper edge 68 of the front panel 54 and a side edge 70 (opposite the open edge 66). The adhesive along the side edge 70 aligns with and adheres to an exposed surface of the hinge tab 56. The adhesive along the upper edge 68 aligns with and adheres to the lower edge 72 of the rear panel 52. Stop zones 74 of adhesive are positioned within the folded envelope portion 46 to contact the stop tabs 67 of the slide panel 50. Additional support zones 76 may be formed with adhesive to ensure smooth and even sliding of the slide panel 50.

Prior to applying the adhesive to the slide panel assembly 44 shown in FIG. 7a, appropriate informative elements 14 are zone-printed to a surface of the sliding panel 50 so that a first appearing informative element 32 and a subsequently viewed second informative element 34 may be selectively viewed through the window cutout 48.

An appropriate low-tack adhesive is additionally applied to the rear surface of the rear panel 52 so that a child may remove the panel-type sticker and apply it within an appropriate blank space 36. The child may immediately view the first informative element 32 which is, in the example shown in FIG. 7b, a question "WHAT DOES A SAILBOAT LOOK LIKE?". The child may then operatively slide the slide panel 50 from its fully recessed position to a fully extended position and view the second (once hidden) informative element 34, which, in FIG. 7c shows a picture of a sailboat. When the child first draws the sliding panel 50 from the envelope portion 46, the frangible points 58 will break thereby allowing the panel 50 to slide freely.

In another related embodiment, a printed and/or colored acetate film may be provided across the window cutout 48 so that the informative elements 32 and 34 which are located on the surface of the sliding panel 50 are altered as the slide panel 50 is drawn from the envelope 46 and the informative elements 32, 34 pass the window cutout 48.

In another embodiment of the invention, the sticker 18 is made up of many small pages of informative elements. Each sticker 18, for example, may be offer an entire story, in itself. The child may read a story, for example, in the main story book 10. The story may introduce a certain character, such as Robin Hood and offer a blank space 36 showing a picture of Robin Hood. The child would then choose, from a separate source, one (mini story book) sticker 18 having a similar picture of Robin Hood on its front outer surface. The chosen (mini story book) sticker 18 would include additional information about, in this case, Robin Hood, such as a story of his background.

In accordance with another embodiment of the invention, sticker pages 18a–18c may be provided. The sticker pages 18a–18c are stickers 18 which are the size of a full page 12 of the book 10. The sticker pages 18a–18c are made up of four separate pages of a story, for example, all sharing a common hinge-line edge 80. One or a number of these sticker pages 18a–18c, such as those shown in FIG. 8 may be attached to each other along a binding edge 82 to form the book 10. The sticker pages 18a–18c are preferably attached to each other using a bead of rubber-based, reusable glue 84 which is provided adjacent to the hinge-line edge 80 of each sticker page 18a–18c. Other appropriate adhesives may be used in place of the rubber-based glue 84. The order of the pages may be entirely up to the child, or in a preferred embodiment, the child may use a sequence of informative elements to help him choose a correct order. For example, in a twenty page story book, sixteen pages of the story may be provided to a child in a non-alterable order. The child may select the last four pages 12, or one sticker page 18a–18c, from a group of sticker pages (such as from the three shown in FIG. 8, and finish the book and the story. The ending of the story is up to the child depending on which sticker page 18a–18c he selects. Of course, any part or all of the story may be interchangeable.

Figure 9:
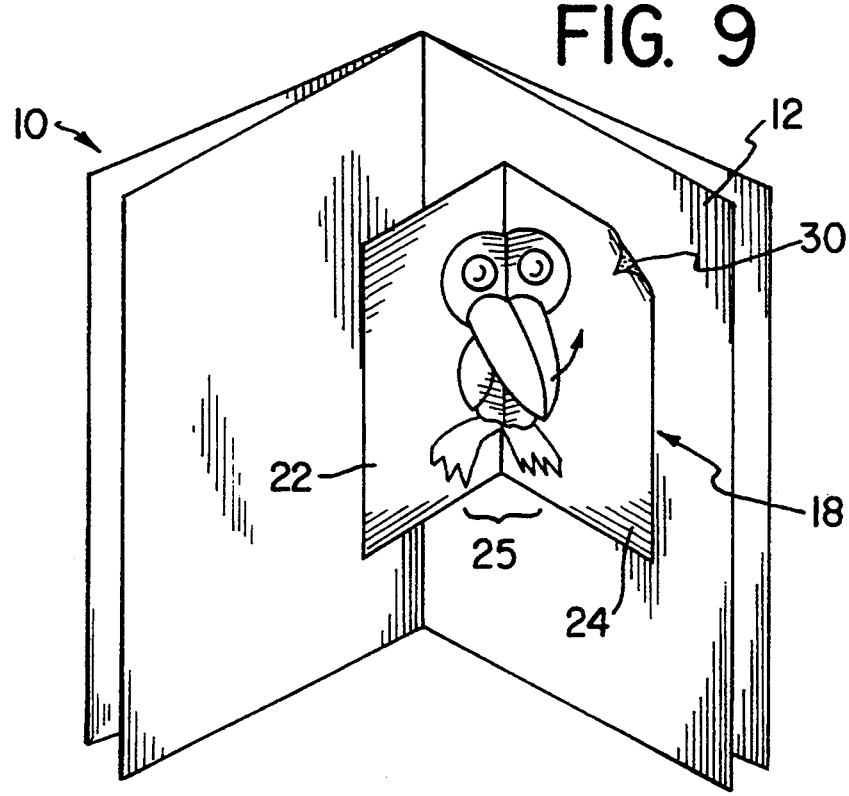
FIG. 9 is a perspective view of a "pop-up" sticker positioned within a page of a story book in accordance with yet another embodiment of the invention.

In accordance with another embodiment, each sticker 18 may be constructed from a single folded sheet of paper, such as shown in FIG. 9, and include a pop-up assembly 25 attached to the inside panels 22, 24, such as shown in FIG. 9. The pop-up assembly "pops-up" when the child opens the sticker 18.

The stickers 18 may alternatively be provided in the form of wipe-off slates including, as before, a folded sheet of paper having a wipe-off slate assembly located between the inside panels 22, 24. The wipe-off assembly may be a conventional type having a supporting board coated with a wax and an overlying frosted sheet of thin plastic. Any impression formed in the plastic darken as it sticks to the wax of the supporting board. The impressions are easily erased by separating the thin plastic sheet from the supporting board. The child may use the sticker 18 to draw a picture of an apple, for example.

Figure 10:
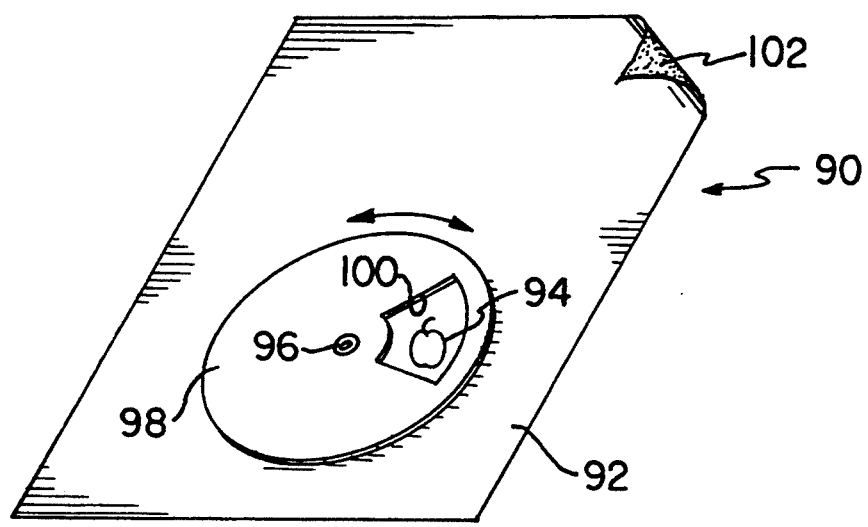
FIG. 10 is a perspective view of a "rotating wheel" sticker in accordance with another embodiment of the invention.

The stickers 18 may also be in the form of a rotating wheel card 90 as shown in FIG. 10 which includes a base 92 having various informative elements 94 positioned about a center rotating point 96. A wheel 98 is attached to the base 92 of the card 90 preferably with a paper rivet (not shown in detail) so that the wheel 98 may be rotated about the center point 96. The wheel includes an opening 100 which is sized and shaped to show a single (or a select number) of informative elements 94, such as the picture of an apple in FIG. 10. The back of the rotating wheel card 90 includes an adhesive 102 so that the rotating wheel card 90 may be selected from a sheet of such cards, removed from the sheet and adhered in a page 12 of a book 10, as described above. Once in position in the book 10, the child may freely rotate the wheel 98 of the card 90 to uncover additional informative elements 94.

I claim:

1. A method of teaching comprising the steps of:
   scanning a first informative element;
   locating an empty space adjacent to said first informative element, said empty space intended to receive a second related informative element;
   comparing with possible others and selecting from a remote source said second informative element, said second informative element being located on an exposed surface of a movable card, said movable card including a hidden surface hiding a third informative element disposed thereon, said hidden surface being selectively exposed so that said third informative element may be selectively viewed;
   placing said movable card within said empty space so that said second informative element may be viewed with said first informative element;
   selectively exposing said third informative element from said hidden surface, said third informative element being related to said second informative element; and
   observing any relationship between said first informative element and said second informative element and any relationship between said second informative element and said third informative element.

2. A story book assembly, comprising:
   a story book having at least one page;
   a first informative element located on said page;
   an empty space located adjacent to said first informative element;
   at least one sticker located at a remote source and including a first and second surface, said sticker having an exposed second informative element located on said first surface and a third informative element that is selectively viewed and located on said second surface, said second informative element being related to said first informative element and said third informative element being related to said second informative element; and
   means for selectively removing at least one sticker having said second and third informative elements from said remote source and attaching said sticker to said empty space so that said relationship between said first and second informative elements can be observed and so that said relationship between said second and third informative elements can be selectively observed on said at least one page.

3. The story book assembly according to claim 2, wherein said sticker includes a rotatable member, said rotatable member has a window, said second informative element being located on an exposed first surface of said sticker, said third informative element being located on a hidden second surface of said sticker, said third informative element being selectively viewed through said window upon the rotation of said member so that said relationship between said second and third informative elements may be observed.

4. The story book assembly according to claim 2, wherein said sticker is shaped to form said second informative element.

5. The story book assembly according to claim 2, wherein said sticker is a folded piece of sheet material and said second surface is selectively hidden from view, said folded piece of sheet material being selectively unfolded along a single hinging edge to expose said second hidden surface.

6. The story book according to claim 5, wherein said second informative element is located on said exposed first surface and said third informative element is located on said at least one hidden second surface.

* * * * *